Oct. 21, 1958 R. K. KAYE 2,857,471

SELECTOR SWITCH CIRCUIT

Filed Nov. 13, 1956

INVENTOR
ROBERT K. KAYE
BY Francis E. Blake
ATTORNEY

United States Patent Office 2,857,471
Patented Oct. 21, 1958

2,857,471

SELECTOR SWITCH CIRCUIT

Robert K. Kaye, Rochester, N. Y., assignor to General Dynamics Corporation, Rochester, N. Y., a corporation of Delaware Application November 13, 1956, Serial No. 621,691

5 Claims. (Cl. 179—18)

This invention relates to selector switches and particularly to such devices employed in telecommunication systems for the extension of communication channels.

The object of the invention is to provide a simpler, more economical and more dependable device for use in switching systems.

The invention is embodied in a trunk switching system where it acts to preselect idle trunks in what is known as a partial secondary trunking plan, though it will be realized that it is of broad application and may be used in any system where the preselection of a facility is required.

The invention resides in the use of a diode to maintain a continuous direct busy back signal from trunk circuits, while the switch is operating to search out and establish a connection to an idle trunk, and which diode makes possible the use of a single combined testing and switching relay without the conventional normal delay in transmission of a busy back signal encountered in self-interrupted preselecting devices. This desirable operation is achieved without the use of the conventional marginal test relay.

The switch and its circuit consists of a set of wipers arranged to sweep over a bank of terminals in a rotary movement whereby a group of outgoing circuits may be repeatedly and continuously tested and whereby the first idle one thereof may be seized. The switch wipers are driven by a magnet in a self-interrupting circuit, the operation of which is halted in response to the placement of the wipers on the terminals of an idle trunk. A cut-through relay is employed to switch through a connection from the incoming terminals of the switch to the selected outgoing terminals thereof. Through the use of a diode which for all practical purposes provides a unidirectional electrical connection, a busy-back connection may be established the instant the trunk on which the wipers are resting is seized over some multiple connection and is continuously maintained thereafter until another idle trunk is seized by the switch and a connection made thereto. By this means it is assured that a trunk or circuit terminated in such a switch may only be seized while an idle trunk or circuit therebeyond is available.

A feature of the invention is the use of a diode in a testing and switching circuit. The problem always associated with the design of this type of circuit has been that the ground on the outgoing test conductor of a busy trunk has to be available to the magnet of the switch for stepping purposes, the incoming test conductor to prevent searching selectors from seizure of this circuit and on what may be termed the right hand side of the switching relay to prevent operation thereof. At the same time the incoming test conductor has to be available to what may be termed the left hand side of the switching relay to produce the switching operation. Conventional circuits have heretofore required additional relays to repeat these conditions and thereby separate the various leads and this has usually required the use of a loop seizure relay in this switch circuit. The use of recently developed diodes with the excellent current carrying capacity thereof and the extremely high backward resistance thereof providing a practical and dependable unidirectional electrical circuit component has solved these problems in a very simple circuit and has eliminated the need for relay repeated signals.

Another feature of the invention is a rotary selector for continuously maintaining a connection to an idle outgoing circuit having but a stepping magnet and a combined testing and cut-through relay for performing the various duties of such a preselecting means. If the circuit which terminates in this switch is seized, the cut-through relay immediately operates and extends a guarding potential to the terminals of the seized outgoing circuit which thereupon causes other like selectors resting on the terminals of this same heretofore idle outgoing circuit to step off and seek another idle circuit. If this selector is one resting on the terminals of such an idle circuit when it becomes thus seized, its stepping magnet, in a self-interrupting circuit will operate and the cut-through relay will act first as a testing relay to detect the next idle outgoing circuit, the guarding potential from the busy outgoing circuit or circuits being continuously maintained in a connection to the guarding circuit terminal of the circuit in which the switch terminates.

Another feature of the invention is what is known as a bridging wiper operating in association with the guarding terminals of the circuits over which this switch is adapted to search. By this means there is no break in the guarding potential returned by the switch to the circuit of which the switch is a part as the switch successively searches over a plurality of outgoing circuits and thus sparking at this point is avoided.

Another feature of the invention is a unidirectional circuit element placed in circuit between an incoming test terminal and an outgoing test wiper with a test relay normally bridged across said element whereby said relay may be operated by a circuit made to said incoming test terminal. When the outgoing test wiper has a circuit made thereto the relay will not operate but the wipers will be moved. When the relay operates it then controls a circuit to prevent any movement of the wipers and then locks to a circuit made thereafter to the said test wiper.

Other features will appear hereinafter.

The drawings consist of one sheet having three figures, as follows.

Figures 1, 2, 3:
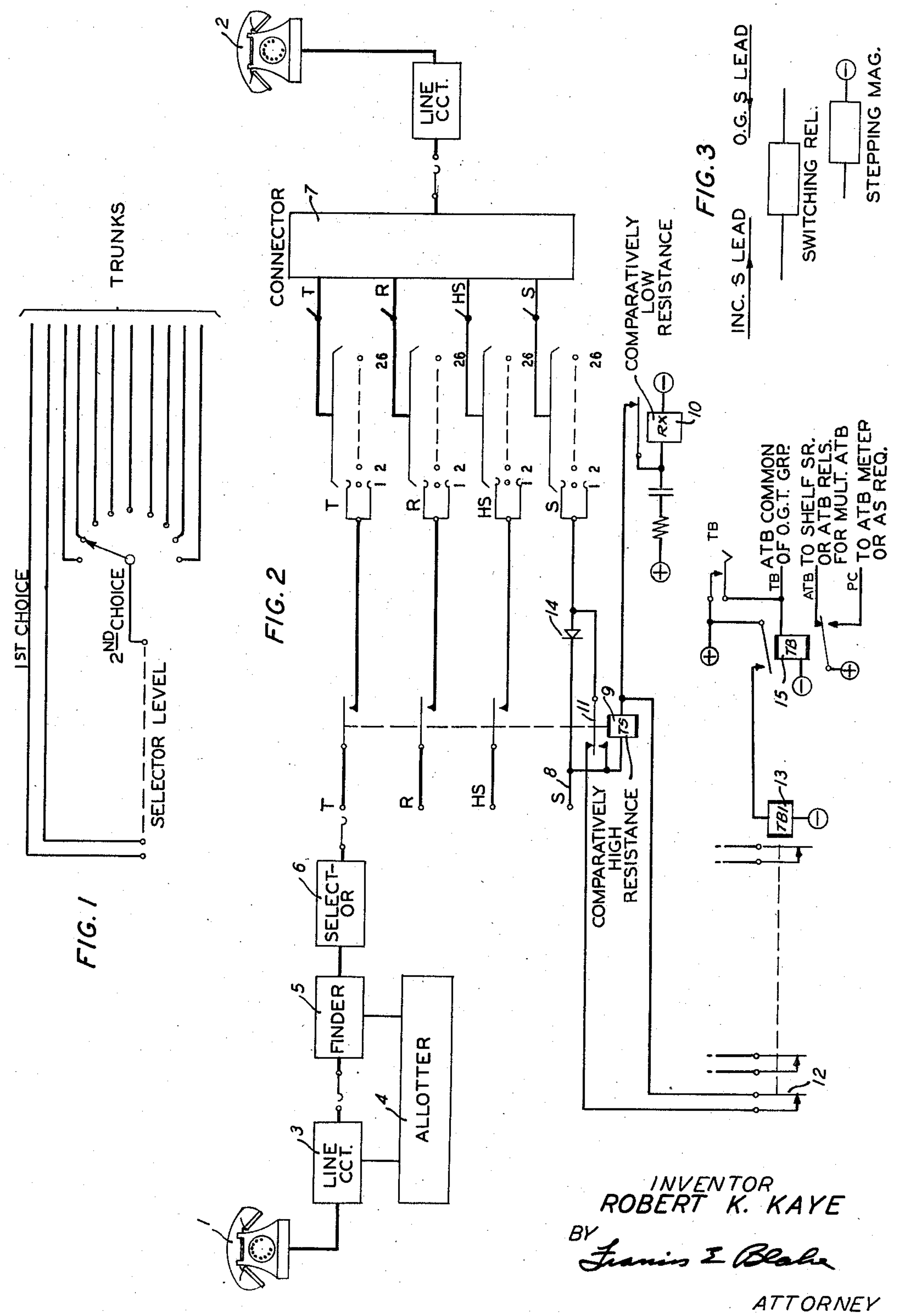
Fig. 1 is a skeleton schematic circuit diagram showing a situation in which the switch of the present invention may be used.
Fig. 2 is a combination block diagram and a circuit schematic diagram showing by blocks certain conventional components used to build up a connection between two telephone subscribers and including the circuit of the present invention in some detail.
Fig. 3 is an explanatory circuit diagram by which the fundamentals of the present invention may be set forth.

The present invention finds one use as a preselector in a partial secondary trunking plan wherein selectors are arranged to work into large trunk groups. As shown in Fig. 1, the first choice outlets of a selector level connect to individual trunks while the last few outlets of such a level terminate in preselectors which have access to a fairly large group of equivalent trunks. Thus a selector may work into a trunk group very much larger than its physical capacity.

Fig. 2 shows the path over which a telephone connection may be established from a calling subscriber's set 1 to a called subscriber's set 2. The subscriber at set 1 makes a call in a conventional manner whereby his line circuit 3 operates the allotter 4 and the line finder 5 picks up the calling line and connects it to the selector 6. The calling party then dials a digit of the number of the called party's line and the selector 6 is set on the level containing trunks leading to the connector 7. Assuming that the selector finds all of the first choice individual trunks busy, it finally selects a trunk terminating in a preselector having its wipers T, R, HS and S resting on the terminals of an idle trunk. As the trunk is seized by the selector 6 a ground in this selector is transmitted over the back sleeve 8, through the comparatively high resistance TS relay 9, the back contact and armature of the comparatively low resistance stepping magnet 10 to battery resulting in the immediate operation of the TS relay 9. The current in this circuit is insufficient to operate the stepping magnet. In the unoperated position of the TS relay 9, a circuit may be traced from the back sleeve 8 through the diode 14, the armature 11 and back contact of relay 9 to the other terminal of this relay, but the diode 14 in this direction presents a very high resistance whereby the relay is not short circuited and will operate. Upon the operation of relay 9 the diode 14 becomes short circuited and so remains during the use of the switch. The TS relay cuts the tip, ring and helping sleeve circuits through to the connector 7 and until the conector places a ground on the sleeve wiper S will extend the back sleeve ground on 8 through its front contact and armature 11. The ground thus extended to the sleeve of this seized trunk will be immediately employed to step other preselectors, which might be camping on these terminals, off and set them to searching out other idle trunks. Thereafter the TS relay will be maintained in operation from ground in the connector over the S wiper, the armature 11 and front contact of the relay TS, the high resistance winding thereof, and the low resistance winding of the stepping magnet. At the end of the conversation this ground will be released, the TS relay will restore to normal and the selector will remain where it is until this particular outgoing trunk is seized over some multiple connection.

When the trunk to the connector 7 is seized over a multiple connection, ground is placed on the outgoing sleeve lead and is immediately extended over the armature 11 and back contact of the TS relay 9, the back contact and armature 12 of the TB1 relay 13, the back contact and armature of the stepping magnet 10 and the winding thereof to battery. The stepping magnet operates to move the wipers of the switch to the next set of terminals. Meantime, the ground extended to the outgoing sleeve is also connected over the, apparently low resistance, diode 14 to the incoming sleeve 8 and due to the bridging type S wiper of the switch is steadily maintained if the next terminal to which it is moved also shows a busy condition. In this circuit the TS relay 9 is shortcircuited so that it will not operate. When an idle trunk is found, characterized by the absence of ground on the outgoing sleeve terminal, the stepping magnet will fail to operate again and the selector will come to rest on the terminals of this idle trunk.

The circuit leading to the TB1 relay 13 is conventional. The TB relay 15 is normally energized so that the TB1 relay 13 is normally released. When all trunks are busy the TB relay 15 is released, whereupon the TB1 relay 13 is operated and thereby opens the circuit between the back contact of armature 11 of the TS relay and the back contact of the armature of the stepping magnet 10 thus preventing unnecessary operation of the preselectors under these conditions. When all trunks are busy, a ground will be present on the sleeve of whatever trunk the wipers have reached and this ground will be passed through the diode 14 to the back sleeve 8, thus marking the incoming terminals as busy. The TS relay 9 will be operated since the contacts 12 are opened but the stepping magnet 10 will not operate since it has the comparatively high resistance of relay 9 in series therewith. Each time the TB relay 15 releases a ground is extended by the lower armature of the TB relay to the PC conductor for peg count purposes. At the end of the all trunks busy condition when the ground is removed from the outgoing sleeve terminal, the TS relay 9 will release.

As explained hereinbefore and as can easily be seen by looking at the diagram, Fig. 3, the problem always associated with the design of this type of circuit has been that the ground on the outgoing S lead from a busy trunk has to be available to the magnet for stepping, the incoming S lead to prevent searching selectors from stopping on this circuit and on the right hand terminal of the switching relay to prevent operation thereof. At the same time the incoming S lead has to be available to the left hand side of the switching relay to allow switching. By the use of recently developed and now commercially available diodes having a very low resistance appearance in one direction and an extremely high resistance appearance in the other direction, the relays heretofore found necessary to establish these circuit conditions may be eliminated and a reliable and completely operative preselector may be devised with a diode, a comparatively high resistance combination test and switching relay and a comparatively low resistance self-interrupting stepping magnet.

What is claimed is:

1. A selector switch having a set of incoming terminals, a set of wipers and a bank of contacts constituting outgoing terminals to be traversed by said wipers, said wipers normally resting on the contacts of a selected set of said outgoing terminals, a stepping magnet in a self-interrupting circuit for driving said wipers, and a relay having a winding normally interconnecting one of said incoming terminals and a corresponding one of said wipers having the double duty of testing for a set of idle outgoing terminals reached by said wipers and interconnecting said incoming terminals and said selected idle set of outgoing terminals.

2. A selector switch having a set of incoming terminals, a set of wipers and a bank of contacts constituting outgoing terminals to be traversed by said wipers, said wipers normally resting on the contacts of a selected set of said outgoing terminals a comparatively low resistance stepping magnet in a self-interrupting circuit for driving said wipers, a comparatively high resistance relay having a winding normally interconnecting one of said incoming terminals and a corresponding one of said wipers having the double duty of testing for a set of idle outgoing terminals reached by said wipers and interconnecting said incoming terminals and said selected idle set of outgoing terminals and a circuit including said relay and said magnet in series for operating said relay.

3. A selector switch having a set of incoming terminals, a set of wipers and a bank of contacts constituting outgoing terminals to be traversed by said wipers, said wipers normally resting on the contacts of a selected set of said outgoing terminals a comparatively low resistance stepping magnet in a self-interrupting circuit for driving said wipers, a comparatively high resistance relay having a winding normally interconnecting one of said incoming terminals and a corresponding one of said wipers having the double duty of testing for a set of idle outgoing terminals reached by said wipers and interconnecting said incoming terminals and said selected idle set of outgoing terminals, a diode normally bridged across said comparatively high resistance relay, said diode being poled so that said relay will respond to a connection made to an outgoing terminal connected to a particular one of said contacts on which said wipers are resting and contacts controlled by said relay for placing said relay in series with said magnet and rendering said relay responsive in a circuit made to both terminals of said diode.

4. A selector switch having a set of incoming terminals, a set of wipers and a bank of contacts constituting outgoing terminals to be traversed by said wipers, a comparatively low resistance stepping magnet in a self-interrupting circuit for driving said wipers, a comparatively high resistance relay having the double duty of testing for a set of idle outgoing terminals reached by said wipers and interconnecting said incoming terminals and said selected idle set of outgoing terminals, a diode connected between an incoming terminal used for test purposes and a wiper cooperatively associated with outgoing terminals used for test purposes, said diode being poled to present a low resistance circuit from said wiper to said incoming test terminal and a high resistance in the opposite direction, said relay having one terminal permanently connected to said incoming test terminal and a second terminal permanently connected to said stepping magnet and contacts controlled by said relay to switch said test wiper from said second terminal of said relay to the said first terminal thereof whereby said diode becomes shortcircuited during the operation of said relay.

5. A selector switch having a set of incoming terminals, a set of wipers and a bank of contacts constituting outgoing terminals to be traversed by said wipers, a comparatively low resistance stepping magnet in a self-interrupting circuit for driving said wipers, a comparatively high resistance relay having the double duty of testing for a set of idle outgoing terminals reached by said wipers and interconnecting said incoming terminals and said selected idle set of outgoing terminals, a diode connected between an incoming terminal used for test purposes and a wiper cooperatively associated with outgoing terminals used for test purposes, said diode being poled to present a low resistance circuit from said wiper to said incoming test terminal and a high resistance in the opposite direction, said relay having one terminal permanently connected to said incoming test terminal and a second terminal permanently connected to said stepping magnet and contacts controlled by said relay to switch said test wiper from said second terminal of said relay to the said first terminal thereof whereby said diode becomes shortcircuited during the operation of said relay and all trunks busy means for opening said connection between said test wiper and said second terminal of said relay.

No references cited.